United States Patent [19]

Verschuur

[11] 4,311,488

[45] Jan. 19, 1982

[54] PROCESS FOR THE UPGRADING OF COAL

[75] Inventor: Eke Verschuur, Amsterdam, Netherlands

[73] Assignee: Shell Oil Company, Houston, Tex.

[21] Appl. No.: 215,789

[22] Filed: Dec. 12, 1980

[30] Foreign Application Priority Data

Feb. 6, 1980 [NL] Netherlands .................. 8000730

[51] Int. Cl.³ .............................................. C10L 5/16
[52] U.S. Cl. ..................................... 44/10 R; 44/24; 209/5; 209/166; 364/502; 210/729
[58] Field of Search .............. 209/5, 166; 23/313 R, 23/314; 44/1 R, 1 B, 1 SR, 10 R, 10 C, 15 A, 23, 24; 210/705, 730, 740, 729; 364/502

[56] References Cited

U.S. PATENT DOCUMENTS

| | | | |
|---|---|---|---|
| 3,027,306 | 3/1962 | Muschenborn et al. | 44/10 R X |
| 3,438,745 | 4/1969 | Smith | 209/5 X |
| 3,605,775 | 9/1971 | Zaander et al. | 364/502 X |
| 4,021,206 | 5/1977 | Huberts et al. | 44/10 R |
| 4,082,515 | 4/1978 | Capes et al. | 23/314 X |
| 4,226,714 | 10/1980 | Furness et al. | 210/740 X |

Primary Examiner—Ralph J. Hill

[57] ABSTRACT

In a process for upgrading an aqueous slurry of fine coal by agglomerating coal particles and separating the agglomerates from the slurry the proportioning of the amount of binder used to agglomerate the coal can be substantially optimized by correlating it with the amount of non-agglomerated particles which remain in the slurry, and the ratio of the value of the upgraded coal to the coal of the binder.

10 Claims, 2 Drawing Figures

PROCESS FOR THE UPGRADING OF COAL

BACKGROUND OF THE INVENTION

The present invention relates to a process for the upgrading of particles in an aqueous coal suspension and in particular to a process for the agglomeration of the coal particles by subjecting them to turbulence in the presence of a binder.

Coal can be classified by size.

Particles larger than, for example, 25 mm are generally called "lumps". Particles of from 150 microns to 25 mm may be referred to as "grains" and particles smaller than 150 microns as "fines". These sizes are not strictly adhered to; for example, the limit between grains and fines may lie between 75 and 250 microns, although a size limit of 100 to 150 microns is of more frequent occurrence. In this specification coal slurries are described which mainly consist of fines, although in some cases grains may be present.

Coal particles in an aqueous slurry are agglomerated by subjecting them to turbulence in the presence of a binder by which the surface of the particles is wetted. When the particles collide owing to the turbulence, they tend to stick together and form loose agglomerates. In certain processes, in which special stirrers are used, the agglomerates can be shaped into spheres or "pellets" which can be further consolidated by hardening them by a heat treatment. Selective agglomeration takes place when an oil-phase binder wets the coal particles in preference to the inorganic particles.

Coal particles in an aqueous slurry have a relatively low monetary value which is generally exceeded several times by the cost of the binder. The quantity of binder used for agglomeration is, therefore, important for the economics of the process. Dosing, or determining the proportion of binder to be used, has hitherto been largely determined by the observations made by the operator during operation.

The primary object of this invention is to provide a more accurate and more efficient dosing method for proportioning the binder.

SUMMARY OF THE INVENTION

The present invention relates to a process for upgrading relatively fine coal particles which are suspended in an aqueous liquid by mixing that slurry of feed solids with an oil-phase binder, agitating the mixture to agglomerate coal particles and separating the agglomerated particles from the slurry.

The invention increases the cost-effectiveness of the process by maintaining a ratio of the binder to feed solids which is correlated with both the proportion of residual non-agglomerated solids that remain within the slurry after the agglomerates have been separated and the value of the upgraded coal particles relative to the cost of the binder used.

In a preferred procedure, the ratio of the binder to feed solids is maintained at a magnitude such that changing it changes the proportion of the residual non-agglomerated particles and the proportion of the binder by amounts such that the numerical value of the ratio of those amounts substantially equals that of the ratio of the value of the upgraded coal particles to the cost of the binder.

A particularly preferred embodiment of the invention comprises a substantially continuous process for upgrading the coal particles in an aqueous suspension by substantially continuously mixing that slurry of feed solids with an oil-phase binder, agitating the mixture to agglomerate the coal particles and separating the agglomerated particles from the slurry. The binder is added to the slurry at a binder supply rate (B). Measurements are made, substantially continuously, of an agglomeration parameter (A) which corresponds to the proportion of residual non-agglomerated particles which remain in the slurry after the agglomerates have been removed. A substantially optimum rate of binder supply addition is provided by changing the binder supply rate, while maintaining a substantially constant rate of adding the slurry of feed solids to the mixture of it and the binder so that a change (Delta B) and a change (Delta A) occur in, respectively, the binder supply rate (B) and the agglomeration parameter (A). Then, if the numerical value of a quotient (Q) equalling (Delta A) divided by (Delta B) is significantly different from the magnitude of a ratio (R) which relates the value of the upgraded coal particles to the cost of the binder in units comparable with those used for (A) an (B), the binder supply rate is adjusted in the direction and to the extent required to reduce the difference between the numerical values of (Q) and (R).

If a change (Delta A) is observed in the agglomeration parameter (A) without the binder supply rate (B) having first been changed, this readily results in a change (Delta B) in the binder supply rate and in a new range of consecutive estimates to optimize the binder supply rate as described above. In this case the change (Delta B) is preferably so chosen that it corresponds with the change (Delta A) observed; in the case of a 2% rise of (A), (B) can be raised (or reduced) by such a degree that (A) may be expected to regain its original value.

DESCRIPTION OF THE INVENTION

Figure 1:
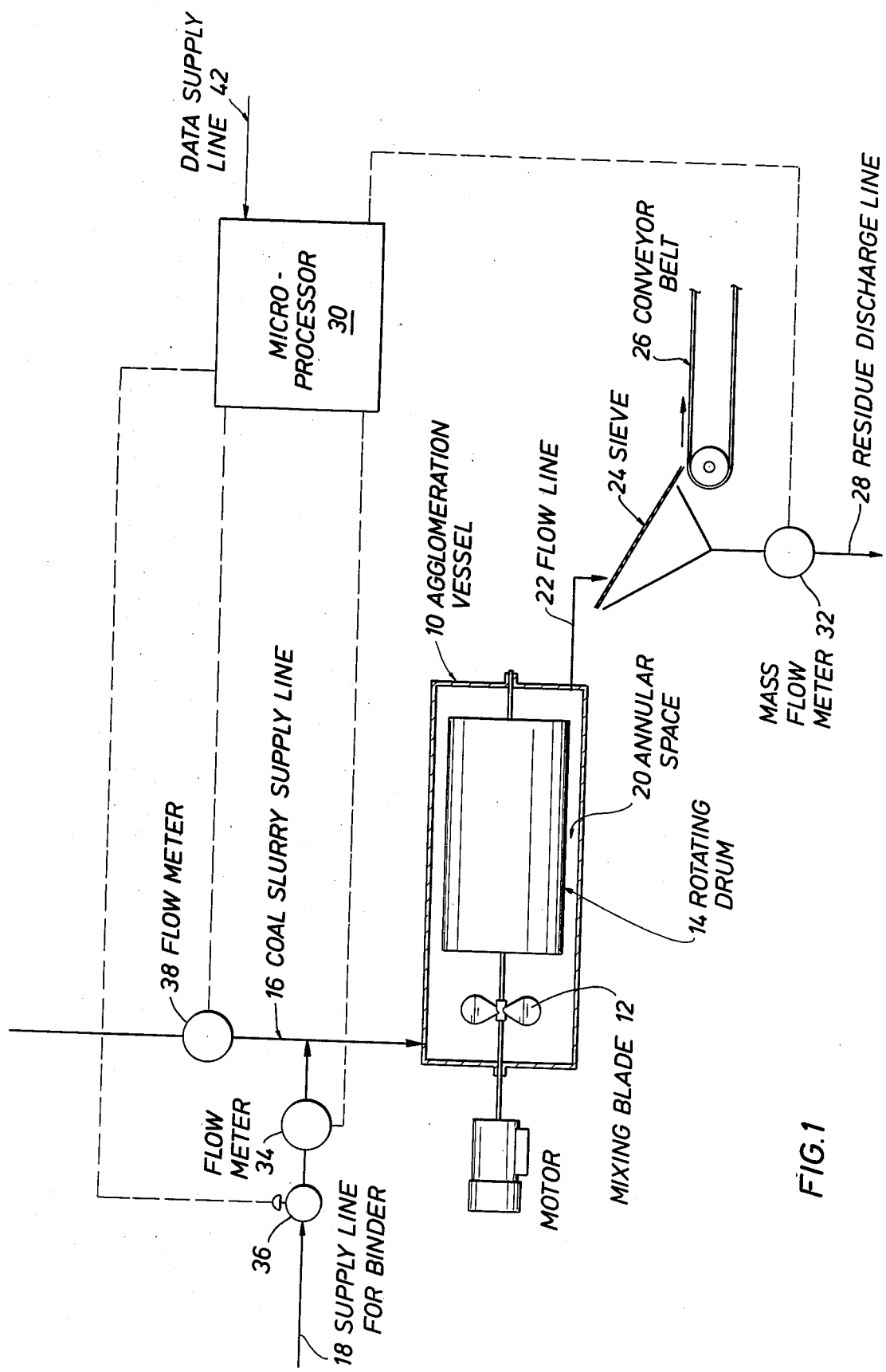
FIG. 1 is a diagrammatic drawing of an apparatus for a continuous agglomeration of coal particles in an aqueous suspension in order to produce pellets.

An important advantage of the invention is that the binder supply rate is controlled with reference to the non-agglomerated particles in the residue (i.e., the slurry from which the agglomerates have been separated) and not by measuring the quantity of agglomerates or pellets produced, which is much less feasible. In this manner a ratio can be determined by means of which the increased quantity of binder, and consequently the increased cost thereof, can be compared with the increased quantity of coal recovered. This results in a very efficient method for controlling the quantity of binder. For example, in a continuous process, whenever changes take place in the quality of the coal supplied, a microcomputer which is programmed by means of the logical control can be used to adjust the rate of binder addition to a new optimum rate of supply of the binder as soon as a change in production is indicated by the proportion of non-agglomerated particles.

In practice there are several parameters which can be easily measured so that the agglomeration parameter (A) can be monitored. A common feature of the parameters is that, when plotted against the ratio of the amount of binder to amount of feed solids, they form a curve which becomes an asymptote when the non-agglomerated quantity hardly decreases no matter how much extra binder is supplied.

Measurements suitable for monitoring the agglomeration parameter (A) can be chosen from the following: the density of the solid particles in the residue, the volume flow or mass flow of the solid particles in the residue, the optical reflection or light transmission of the residue, or an electrical measurement such as capacitance, which is related to the mass flow or volume flow of the solids in the residue, or the density thereof.

In some cases the quotient (Q (=Delta A/Delta B)), can be negative, such as in the event of (A) being related to the mass or the volume of the solids in the residue. For this reason use is generally made of the numerical value (/Q/) of the quotient for comparison with the optimum ratio (R), of the value of the upgraded coal product to the cost of the binder.

Further, a bend will in most cases occur in the part of the curve corresponding with the lower values of the binder supply rate (B), which values are considerably lower than the optimum required. For this reason an estimated value is preferably chosen for the binder supply rate (B) with an allowance being made for the total mass flow of the coal particles in the feed. A suitable way of doing this is to take, as a basis, a binder supply rate corresponding approximately with the types of feed to be processed. These data can be stored for future use.

In order to accelerate the response of the binder supply control action, the binder supply rate can be related to the feed flow rate. The feed flow rate can be continuously measured and any variation in it can be used to change the binder supply rate, by altering the parameter (A), without waiting until a sub-optimum production level is reached. Of course, there should be a time lag between a change in the quality of the feed and the supply of binder, and the control system should allow for this.

Instead of continuously changing the binder supply rate in order to determine the optimum flow at a certain moment and in order to prevent fluctuations, it is in practice possible to modify the control system, so that no action takes place if $(R-r) < /Q/ < (R+r)$, where (2r) corresponds with a range suitable for operation.

The invention is suitable for various processes for the agglomeration of coal, in which it is immaterial whether the agglomeration is carried out continuously or batch-wise and in one or more steps. The process is suitable for selective and non-selective agglomeration, although when the optimum point is attained, in the former case it may be difficult to observe the changes in the coal losses in the residue sufficiently accurately. In some cases it may even be necessary to add a marking substance or colorant which substantially remains behind in the residue and indicates the agglomerated coal.

The invention will now be further illustrated with reference to examples and the appertaining drawing.

The system of FIG. 1 consists of an agglomeration vessel 10 provided with a motor-driven stirrer with a mixing blade 12 and a drum 14. An aqueous suspension of coal particles is fed to the agglomeration vessel 10 via line 16 to which a binder is supplied through a line 18. When the suspension and the binder are subjected to turbulence by the rotating mixing blades 12, they are thoroughly intermixed. The resulting mixture then flows through an annular space 20 between the rotating drum 14 and the walls of the agglomeration vessel, where high shear stresses occur and pellets are formed. The pellets leave the agglomeration vessel through a line 22. Water and non-agglomerated particles (the residue) are separated from the pellets by retaining the pellets on oblique sieve 24 through which the residue can flow. The pellets are removed from the bottom of the sieve by a conveyor belt 16 and the residue is discharged through a line 28.

The process is controlled by means of a microprocessor 30 which activates a valve 36 in the binder supply line 18 on receipt of data from a mass flow meter 32 (for solids) fitted in the residue discharge line 28, and from a mass flow meter 34 (for the binder) fitted in the binder supply line 18. Another flow meter 38 (preferably a mass flow meter) fitted in the coal slurry feed line 16, informs the processor 30 of the flow rate of the suspension entering the agglomeration vessel 10. The latter arrangement can increase the speed with which the processor responds to changes in the rate at which the mass flows into the agglomeration vessel, so that the binder supply rate can provisionally be changed in response to a change in the mass feed, without having to wait for a change in the observed flow rate of the residue.

In practice certain original data of the basic characteristics of different potential feeds can be stored in a memory for future use. After receipt of a certain feed, it is recorded in the processor via 42 and the value of the binder supply rate is approximately set. The correct quantity of binder is then supplied in accordance with the feed flow rate. As soon as production has been stabilized (while initiating the agglomeration, more binder is often required than at steady flow rate), the optimizing method according to the invention can be used.

A change (Delta B) is made in the binder supply rate and after stabilization the resulting change (Delta A) in the agglomeration rate is obtained by means of the change in the parameter which is measured in the residue in order to obtain an indication of the quantity of non-agglomerated solids in the agglomeration vessel. The quotient Q=(Delta A)/(Delta B) can be calculated in this manner and the numerical value can be compared with the optimum ratio R. If /Q/>R, the binder supply rate is increased and if /Q/<R said supply rate is reduced. In order to avoid fluctuations a permissible operating range of 2r is established so that no change is made if $R-r</Q/<R+r$.

When calculating R, allowance should be made for the nature of the parameter A and the units in which the latter is measured, compared with those of the binder supply rate. Further, allowance should be made for the relative value of the binder and the pellets. In the simplest case A and B are, for example, measured in tons/h; in the boundary condition where the increased value of the coal recovered is equal to the increased cost of the binder, $$(\text{Delta A}) \times V_a = (\text{Delta B}) \times V_b$$

where $V_a$ is the value of the pellets and $V_b$ is the value of the binder, then the optimum value of R will be equal to $V_b/V_a$.

In the event of the parameter A being stated in different units, a factor K can be used to determine the ratio R.

If A is related to the mass of the pellets obtained according to a more complicated ratio, then the correct formula must be used to determine the ratio R.

As stated above, an operating range between $(R+r)$ and $(R-r)$ may be considered suitable for preventing the continous introduction of changes and fluctuations. In certain cases where the symmetry of the curve is insufficient, the value of R can be adapted so that the range chosen represents the maximum attainable.

Figure 2:
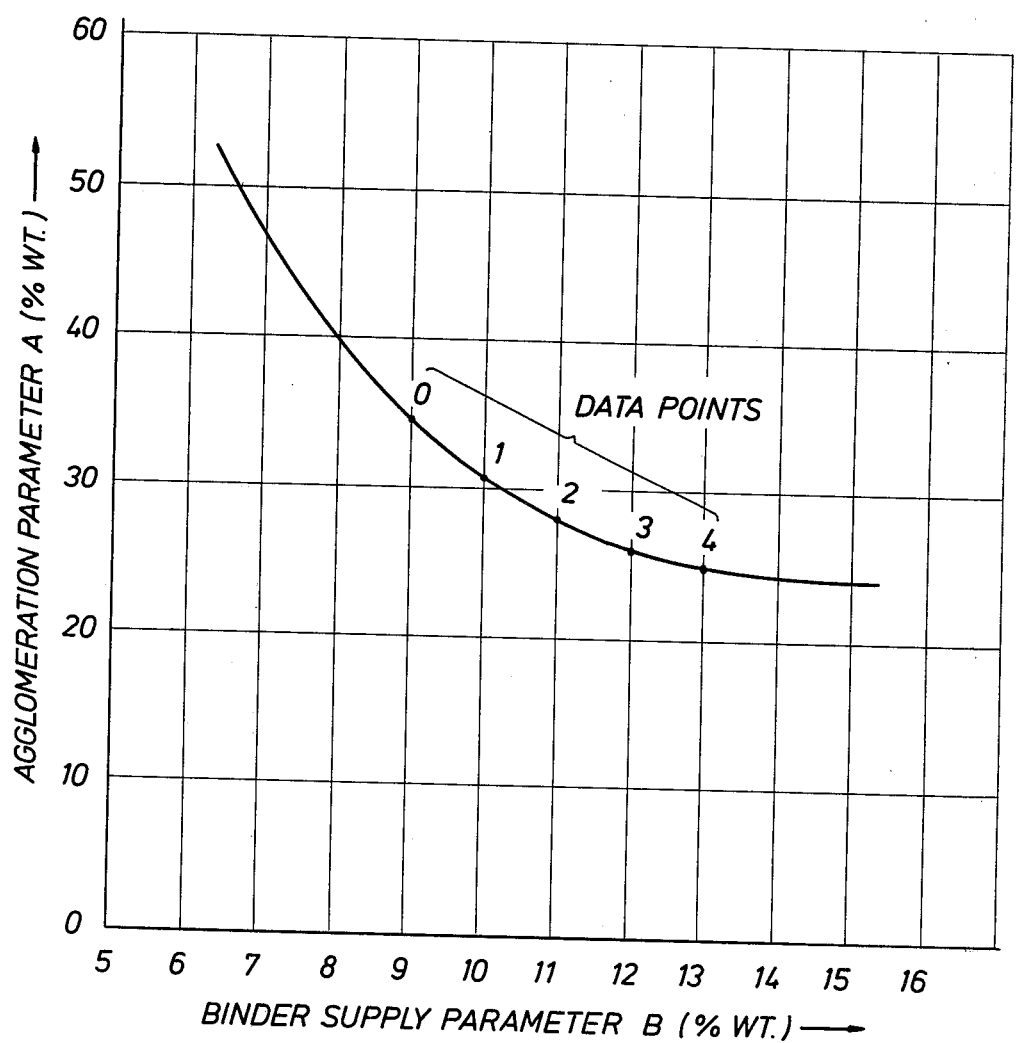
FIG. 2 is a graph in which the weight percentage of the solids feed that remains in the residue after agglomeration is plotted against the weight percentage of binder (based on the solids feed) introduced to agglomerate coal particles in an aqueous suspension being treated as described in connection with FIG. 1.

In FIG. 2 the parameter A, which relates to the non-agglomerated solids, is plotted as weight percentage of the solids feed against the binder supply rate B. A relates to a typical hard bitunimous coal of average volatility which contains 25% by weight of free ash (35% by weight in all) and 1.2% by weight of sulphur. The coal was fed in an aqueous slurry containing 20% by weight of solids which were ground to a size below 250 microns. The binder was a short residue containing 1% by weight of sulphur and having a viscosity of 400 cS at 60° C.

The value of the coal pellets recovered was $30/ton and the cost price of the binder was $60/ton. R is then equal to 2, which value is calculated in the above-mentioned manner.

After the agglomeration of the suspension had been successfully started, the binder supply rate B was set as 9% by weight. When steady-state conditions had been reached, it was found that 34.5% by weight of the particles fed to the agglomeration vessel had not agglomerated and remained in the residue (Data Point 0). Since it was assumed that the optimum quantity of binder for this feed was about 12% by weight, the binder supply rate B was raised by 1% by weight to 10% by weight with the result that a change (Delta A) of 3.5% by weight was affected in A (Data Point 1). In other words, an incremented increase of 1% in the 9% proportion of amount of binder to amount of feed solids resulted in a decrease of 3.5. in the proportion of non-agglomerated solids and an increase of 1 in the proportion of binder, which provided a ratio of those changes of 3.5, i.e.:

(Delta A)/Delta B)=$(-3.5/1)$, ie/$Q_1$/=3.5

After the binder supply rate, based on the solids feed rate, had been increased to 11% by weight, the quantity of non-agglomerated particles fell by 3% by weight of 28% by weight (Data Point 2), so that /$Q_2$/=3. By supplying an additional 1% by weight of binder the total as increased to 12% by weight, after which a further fall in (Delta A) of 2% by weight was observed (Data Point 3), so that /$Q_3$/=2.

However, when 13% by weight of binder was used, an additional quantity of only 1% by weight of coal was recovered (Data Point 4), so that /$Q_4$/+1.

In that case /Q/ is equal to R at 12% by weight of binder and the increased coal yield, obtained by means of a larger quantity of binder, is insufficient to cover the higher costs. Therefore, the supply of binder is reduced to 12%, which is the maximum.

Slightly different standards would apply if the coal is sold according to the calorific value, for example per gigajoule. The binder generally has a higher calorific value than the coal and in the quantities applied it will contribute to the heating value of the coal. R can subsequently be reduced by dividing said value by the numerical ratio of the calorific value of the binder to that of the coal.

In some situations, it may be difficult to provide a significantly cost-effective ratio of binder to feed solid where the agglomerated coal particles are being separated from the aqueous slurry in which they are formed by mechanical means such as screening or centrifuging to remove particles having diameters of at least about 150 microns. Such a difficulty may be due to one or more factors such as the size and/or physical or chemical properties of the coal particles and/or the cost of the oil phase binder at the treatment location and/or the value of the upgraded coal particles at the treatment location, etc. In such a situation, it may be desirable to agglomerate the coal particles only to an extent such that, although the particles are too small for an economically feasible machanical separation, they are large enough and uniform enough to facilitate their separation by froth flotation, and then separate those relatively undersized agglomerates by a froth flotation procedure. This necessitates the use of only a relatively limited proportion of binder and the cost effectiveness of doing so can readily be determined by the procedure described above. Particularly suitable procedures and situations for utilizing limited proportions of binder to form such micro-agglomerates and then separating the agglomerates from the aqueous slurry in which they were formed by means of froth flotation are described in my co-pending patent application Ser. No. 224,990 filed Jan. 14, 1981. The disclosures of that application are incorporated herein by cross-reference.

Where desirable the present invention can be advantageously employed in conjunction with a multi-stage coal particle agglomerating process. In such a process, the coal particles are agglomerated-within and separated-from the aqueous slurry of feed solid by means of a plurality of agglomerating screening steps. One portion of the total production of binder is used in the first of such steps. An additional portion is used in a second step, in which the aqueous slurry of feed solids being treated is that which flows through the screen of the first step. And, some or all of the remaining of the binder is employed in a third step in which the slurry being treated is that which flows through the screen in the second step. The measurements of the agglomeration parameter (A) are made on the aqueous slurry which flowed through the screen in the third step. The so-separated coal agglomerates are preferably blended together to provide a coking coal product having selected properties with any remaining portions of the agglomerates being supplied as a thermal coal product.

Where it is desirable to use an oil-phase binder which is relatively viscous, it can be diluted with a suitable oil solvent. Low boiling solvents are preferred and can be recovered and reused or vented to the atmosphere. $CO_2$ is asuitable solvent which can be dissolved under pressure in a viscous oil binder. The $CO_2$-diluted binder can then be used to agglomerate coal, as described above. In adjusting the cost-efficiency in accordance with the present invention, the cost of the solvent and any pressurization applied should be included in the cost of the binder.

Where desirable, the coal particles which are agglomerated as described above, can be treated with a suitable solvent such as $CO_2$, toluene or the like, to remove additional water and/or to recover binder and extract other oil-like materials from the coal. Such an extraction is preferably carried out at a pressure sufficient to keep the solvent used in a liquid phase and the solvent and binder are preferably recovered for reuse.

Where desirable, the coal/oil agglomerates produced as described above, can be mixed with residual oil or coal to be coked. Such a procedure is advantageous that during the coking operation the fines tend to become a part of the coke matrix and the oil-phase binder used for the agglomeration can be readily recovered for reuse.

Particularly where the suspension of coal particles in an aqueous liquid to be upgraded is relatively high in feed solids content, the quality of the product can be improved by injecting clean water into the feed and/or the vessel in which the mixture of an aqueous slurry of feed solids and oil phase binder is agitated in order to agglomerate the coal particles. The so-injected water should be substantially free of any suspended mineral particles so that its injection increases the ratio of coal to non-coal minerals within the agglomeration vessel.

Where it is desirable to use a relatively heavy fuel oil such as a No. 6 fuel oil or residue as the oil-phase binder, the aqueous slurry can advantageously be pretreated to improve the speed and uniformity with which the coal particles are wetted by such binder. Prior to contacting the aqueous slurry of solids with the binder, the slurry is mixed with enough lighter hydrocarbons, such as a No. 2 fuel oil, and is agitated to an extent sufficient to coat the surfaces of the coal particles with the lighter hydrocarbon before they are contacted with the heavy oil.

Where desirable, in order to provide a relatively dry coal product, the coal particle aggregates produced as described above, can be advantageously compacted in a briquetting apparatus. Such a procedure may be particularly advantageous where the agglomerates are micro-agglomerates which were separated from the slurry in which they were formed by froth flotation. Such a froth is relatively high in moisture and the compacting of the wet froth in a briquetting apparatus tends to effect a simultaneous compacting and dewatering of the coal.

What is claimed is:

1. In a process for upgrading relatively fine coal particles which are suspended in an aqueous liquid by treating such a suspension as an aqueous slurry of feed solids and mixing it with an oil-phase binder, agitating the resultant slurry to agglomerate coal particles, and then separating the agglomerated particles from the slurry, the improvement for increasing the cost-effectiveness of the coal particle agglomerating and separating process by using a ratio of binder to feed solids which substantially minimizes both the proportion of the residual non-agglomerated solids which remain within the slurry after the agglomerated particles have been separated from the slurry and the ratio of binder to feed solids, comprising:

mixing and agglomerating measured amounts of feed solid particles and binder;

removing the agglomerated particles and measuring the proportion of the feed solid particles which were not agglomerated and not removed;

repeating said agglomerating and measuring steps while using a different ratio of binder-to-feed solid particles and measuring the resultant proportion of feed solid particles not agglomerated and not removed; and using a ratio of binder-to-feed solid particles having a value such that an incremental increase in the ratio causes only a relatively small decrease in the proportion of feed solid particles which are not agglomerated, since the ratio used has a value corresponding to a substantially asymptotic portion of a curve of the variation in proportion of non-agglomerated feed solid particles with increase in the ratio of binder-to-feed solid particles.

2. The process of claim 1 in which said proportion of non-agglomerated feed solid particles is measured by measuring the density of solid particles remaining in the slurry after the removal of the agglomerated particles.

3. The process of claim 1 in which the ratio of binder-to-feed solids is limited to such an extent that the agglomerates are too small to facilitate their mechanical separation from the slurry but are large enough and sufficiently uniform in size to facilitate their separation by froth flotation and such agglomerates are separated by froth flotation.

4. The process of claim 3 in which the froth containing the micro-agglomerated coal particles is compacted in a briquetting operation to form larger particles while simultaneously being dewatered.

5. The process of claim 1 in which the binder is a mixture of viscous oil and low boiling solvent employed at a pressure and temperature at which the solvent is liquid;

the solvent is recovered for reuse by vaporizing it from the agglomerated coal particles; and, the cost of pressurizing solvent and replacing lost solvent is included as binder cost in adjusting the ratio of binder-to-feed solid.

6. The process of claim 1 in which the agglomerated coal particles are contacted with a volatile oil solvent to displace water and dissolve binder and oil-like substances from the aggregated coal particles;

solvent and binder are separated by distillation and recovered for reuse; and, the cost of the solvent extraction and makeup of lost solvent and binder are included in the binder cost utilized in adjusting the ratio of binder-to-feed solids.

7. The process of claim 1 in which the agglomerated coal particles are mixed with residual oil or oil to be coked and the mixture is supplied as the feed for coking operation which is capable of causing the fine coal particles to become part of the coke matrix and making at least some of the binder available for being recovered.

8. The process of claim 1 in which water which is substantially free of suspended mineral matter is included within the mixture of the aqueous slurry of feed solids and oil-phase binder which is agitated to agglomerate the coal particles.

9. The process of claim 1 in which the aqueous slurry of feed solids is pretreated by mixing it with enough light oil to oil-wet substantially all of the coal particles and then is mixed with a relatively viscous oil-phase binder; and, the cost of said pretreatment is included within the binder cost which is utilized in adjusting the ratio of binder-to-feed solids.

10. The process of claim 1 in which the coal particles are subjected to a multiplicity of agglomerate-forming and agglomerate-screening-out separation steps in which one portion of the total amount of binder is used in the first step and an additional portion is used in a second step in which the slurry being treated is the slurry which flowed through the screen in the first step and some or all of the remaining portion of the total amount of binder is used in a third step in which the slurry being treated is the slurry which flowed through the screen in the second step; and, the so-separated agglomerates are blended together to provide a coking coal product having selected properties and, after said measurement of non-agglomerated particles, the remaining portions of the slurry are supplied as a thermal coal product.

* * * * *